INVENTOR.
HARRY C. THOMSON
BY
ATTORNEY

INVENTOR.
HARRY C. THOMSON
BY
ATTORNEY

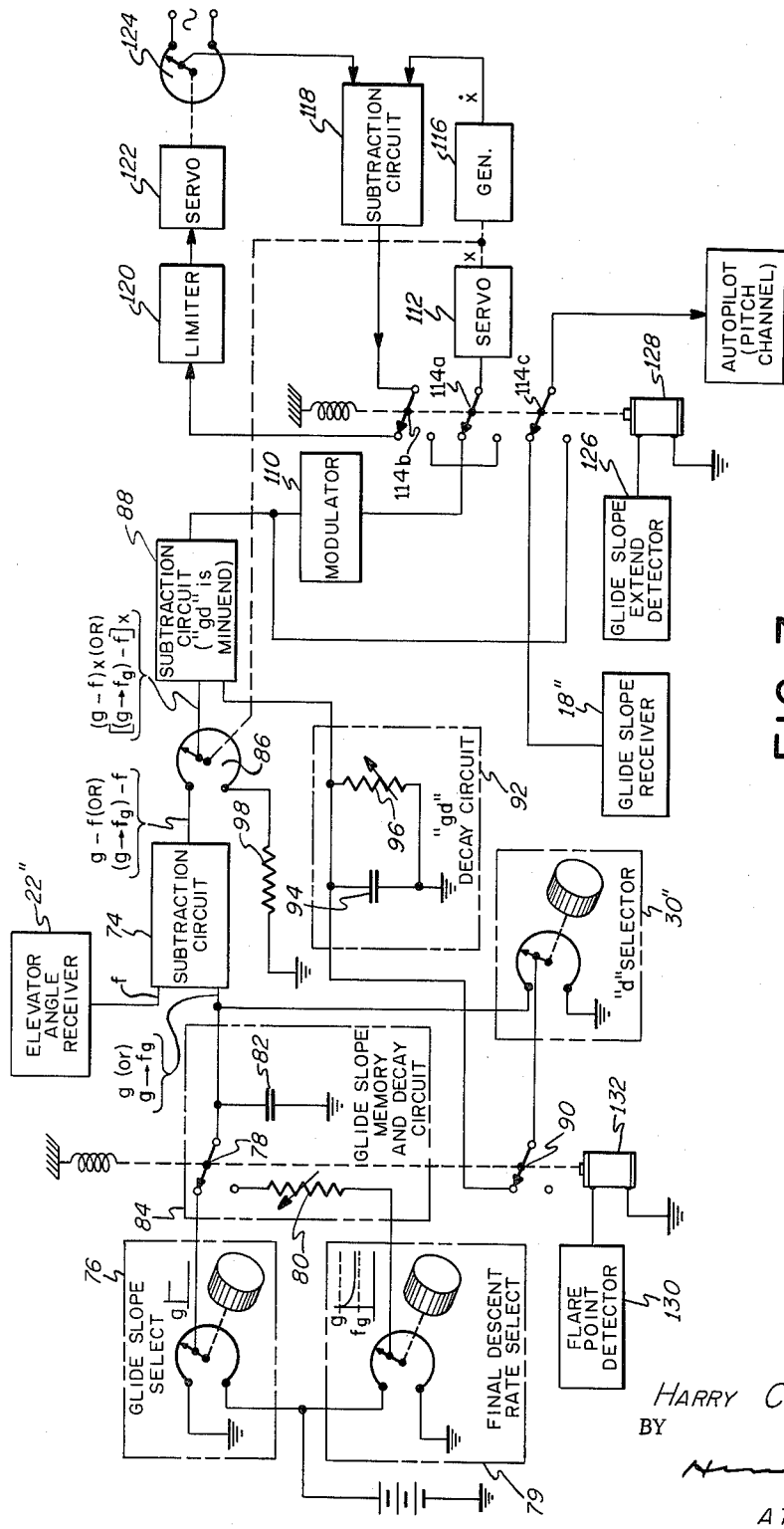

United States Patent Office 3,210,763
Patented Oct. 5, 1965

3,210,763
FLIGHT CONTROL SYSTEM
Harry C. Thomson, Northport, N.Y., assignor to Sperry Rand Corporation, Great Neck, N.Y., a corporation of Delaware
Filed Mar. 19, 1962, Ser. No. 180,714
12 Claims. (Cl. 343—108)

This invention relates in general to flight control systems and in particular to apparatus for controlling the flight of an aircraft during a landing maneuver.

Most presently employed apparatus for controlling the flight of an aircraft during a landing maneuver control the craft along a glide slope to some predetermined point in space by radio means, e.g. the Instrument Landing System. Thereafter, since radio noise, interference etc. make the Instrument Landing System difficult to use at low altitudes, the craft (by sundry means) is made to fly along a non-radio defined path until, at another predetermined point in space, a flare maneuver is executed. With such techniques, the assurance provided by a continuous direct radio link with the runway disappears when the first mentioned predetermined point in space is reached; from that point on the craft flies to the runway, not under the control of signals produced at the runway, but undesirably under the control of signals produced solely within the craft and having no continuous reference to the runway.

By means of the present invention, control is maintained first along an initial glide slope and then along a final glide slope, such control being provided continually by a radio link with the ground. In changing from control along one glide slope to control along another, the craft is caused to execute a flare maneuver. Since two radio defined glide slopes are necessary to the invention, it is appreciated readily that the invention serves not to eliminate, but to complement such systems as the Instrument Landing System.

In one form of the invention, control along a first glide slope course is maintained by a direct radio link with that course; after a predetermined point in space is reached, control along such first glide slope is continued by means of a novel computational arrangement requiring data derived from a radio link with a second glide slope. Then, when a second predetermined point in space is reached, the "computational" control is eliminated entirely and control along a second, i.e. the final descent, course is maintained by a direct radio link with that course. In changing from "computational" control along the first glide slope to radio control along the second, the craft is caused to execute a flare maneuver.

In a presently preferred form of the invention the transition to direct radio control along the second course is provided by adjusting the "computation" in a predetermined manner, thereby causing the craft to fly a flare maneuver determined by the manner in which the "computation" is changed. With this form of the invention, the craft is so flown that the pitch channel pointer of a cross pointer indicator is maintained continually in its neutral position during the whole landing maneuver.

A principal object of the invention is to provide a system for controlling the flight of an aircraft during a landing maneuver.

Another object of the invention is to provide an aircraft flight control system for controlling a craft first along one glide path and then along another.

Another object of the invention is to provide an aircraft flight control system for use during landing maneuvers, such system utilizing both the Instrument Landing System and an auxiliary radio system.

Another object of the invention is to provide an aircraft landing control system having facilities for varying the flare path ordered by the system.

Another object of the invention is to provide apparatus for computing the range of an aircraft from a particular point on the ground.

The invention will be described with reference to the figures wherein:

FIG. 7 is a schematic block diagram of the presently preferred landing control system.

Figure 1:
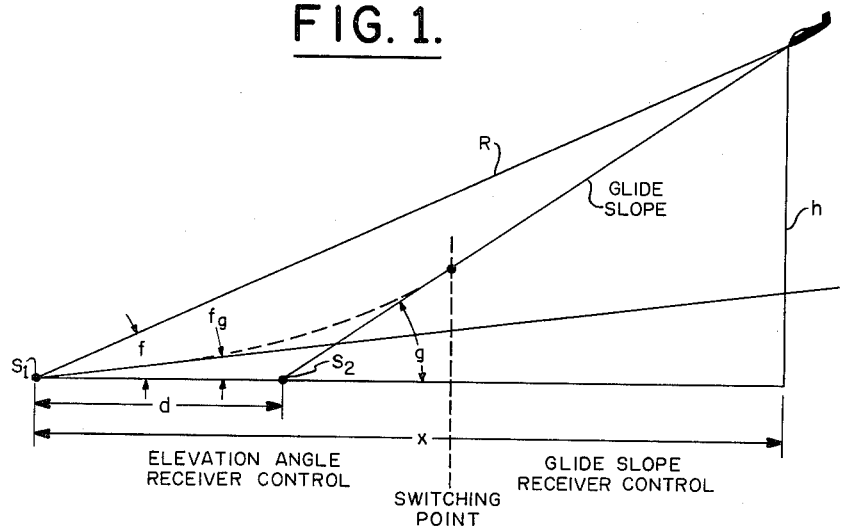
FIG. 1 is a diagram useful in describing a concept used by all forms of landing control systems embodying the invention.

In FIG. 1 an aircraft is shown descending along a radio defined glide path designated Glide Slope and at the same time being at a slant range $R$ from a radio transmitter site $S_1$, the glide slope being defined by a radio transmitter located at the site $S_2$. The craft altitude is designated $h$ and the angle that the glide slope makes with the ground is designated $g$. The angle $f$ defines the elevation angle of the craft at the site $S_1$, and the distances $X$ and $d$ are respectively the distance of the craft from the site $S_1$ and the distance between the sites $S_1$ and $S_2$. A point, designated Switching Point, is where control of the craft during a landing maneuver is switched from one form of radio control to another, such point being determined generally by the nature of the craft and the flare maneuver desired. The angle $f_g$ is the angle that the final descent course makes with the ground.

Figure 2:
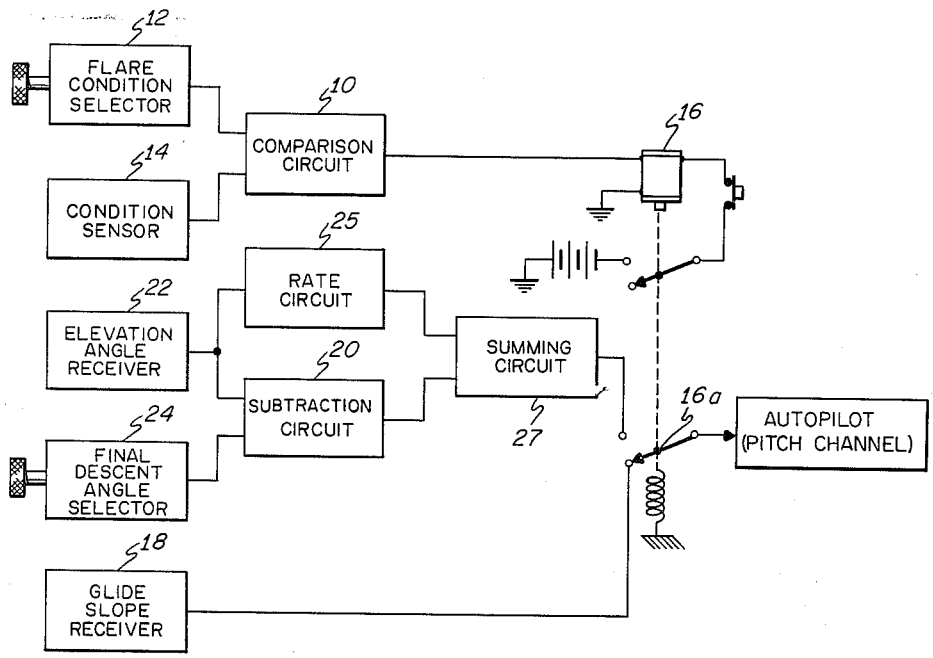
FIG. 2 is a block diagram of one form of the invention.

Referring now to FIG. 2, aircraft control apparatus for providing the landing maneuver of FIG. 1 has a comparison circuit 10 adapted to receive signals from a flare condition selector 12 and a condition sensor 14. The flare condition selector 12 may, for instance, be a potentiometer adapted to provide a signal proportional to a predetermined value of one of the variables in the continually changing FIG. 1 triangle having the sides $R$, $X$ and $h$; the condition sensor 14 provides a signal proportional to the instantaneous value of the variable for which the flare condition selector 12 is set: For example, with the selector 12 set to provide a signal representing a particular altitude, i.e. a particular value of $h$, the sensor 14 would be an altitude sensor providing a signal representing an instantaneous measure of altitude. The selector 12 and sensor 14 output signals, when exactly equal, cause the comparison circuit 10 to produce an output positive pulse, such comparison circuit being, for example, like the circuit shown and described in Massachusetts Institute of Technology Radiation Laboratories Series, volume 19, page 343, McGraw-Hill Book Company, New York. The comparison circuit 10 output pulses are applied to a self-holding relay 16.

When the relay 16 is not energized, the output signal from a glide slope receiver 18 is applied through a switch 16a to the pitch channel of the craft autopilot. A comparison circuit 20 (which may, for example, be one of the circuits shown and described in Electronic Analog Computers, Korn and Korn, page 209, FIG. 520, McGraw-Hill Book Company, New York), receives signals from an elevation angle receiver 22 and a final descent angle selector 24. The elevation angle receiver provides a signal proportional to the angle $f$ (see FIG. 1). For a description of radio equipment for producing a signal proportional to the angle $f$, reference should be had to IRE Transactions on Aeronautical and Navigational Electronics, volume ANE-6, Number 2, June 1959, page 135, and Aviation Week, July 17, 1961, page 69, McGraw-Hill Publishing Company, New York, such equipment forming no part of the present invention but merely providing an output signal usable therewith. The final descent angle selector 24 provides the signal $f_g$ and may be a potentiometer which is set by the pilot of a particular final descent course, such course being as aforementioned dependent on the nature of the craft and the flare path desired. Typical values for $f_g$ and $g$ are .5 and 2.5 degrees respectively. A rate circuit 25 receives the output signal from the receiver 22 and applies its output signal $\dot{f}$ to a summing circuit 27, such circuit also receiving the comparison circuit 20 output signal. The output signal from the summing circuit is applied to the autopilot when the switch 16a is in its UP position.

In operation, the craft maintains position along the glide slope by applying (prior to the switching point) the output signal from the glide slope receiver 18 through the switch 16a to the autopilot pitch channel, such switch being normally held in its DOWN position by a spring. Any departure of the craft from the glide slope causes the glide slope receiver 18 to produce, as is well-known, an output signal which, by being applied to the autopilot pitch channel, causes the craft to reassume continually its position along the glide slope. At the switching point, the comparison circuit 10 produces an output signal, i.e. the triangle $XRh$ has a particular configuration, thereby causing the relay 16 to become energized and causing the switch 16a to move to its UP position. With the switch 16a in its UP position, the output signal from the summing circuit 27 is applied to the pitch channel of the autopilot. At the instant the relay 16 is energized, the elevation angle receiver output signal must be different from the output signal from the final descent angle selector 24; with the rate circuit output signal weighted to equal in amplitude the "displacement" output signal from the comparison circuit 20 (at the switching point), the summing circuit 27 has no output signal at that time. As a result, the craft starts to nose up to keep the summing circuit from having an output signal and, in so doing, a flare maneuver is effected as the craft asymptotically acquires the final descent course.

The apparatus of FIG. 2 operates on the premise that the glide slope receiver 18 is capable of controlling the craft to the altitude at which the flare maneuver is initiated. For many craft, however, the flare maneuver must be executed at a substantially lower altitude; with such the case, control along the glide slope probably cannot be maintained by the glide slope receiver just prior to the execution of the flare maneuver. Therefore, by means of a modification of the apparatus of FIG. 2, glide slope control of the craft below a certain altitude is maintained, not by the glide slope receiver output signal, but by the output signal from the elevation angle receiver.

Figure 3:
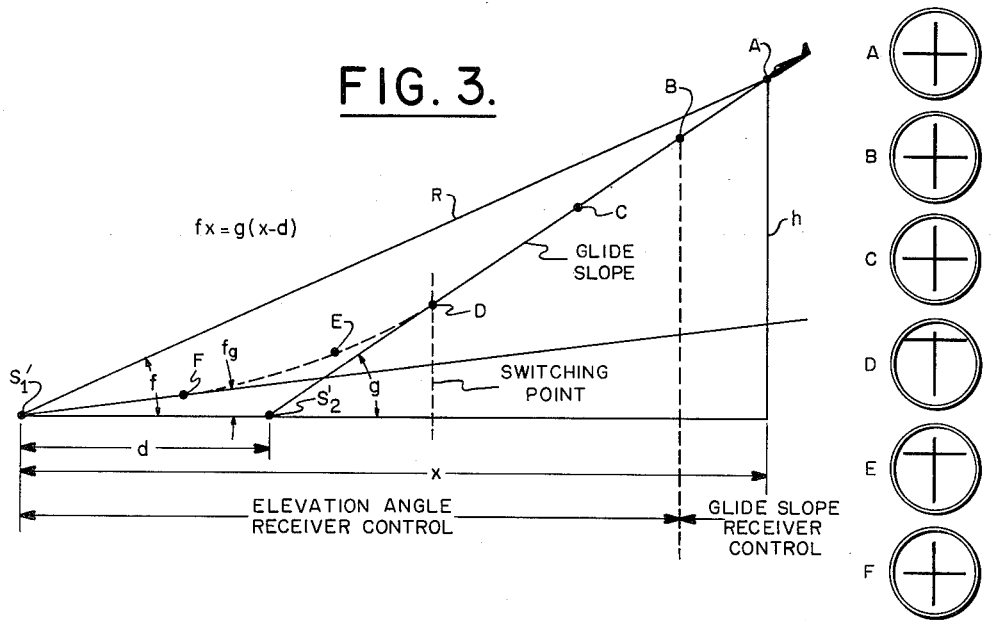
FIG. 3 is a diagram useful in describing the presently preferred forms of the invention.

Referring to FIG. 3, the craft (with the modified apparatus) is flown down the glide slope to a point B under control of the glide slope receiver output signal; between points B and D, glide slope control is maintained generally by the output signal from the elevation angle receiver; from point D to touchdown the craft is flown to assume the final descent course by means of the elevation angle receiver output signal.

Figure 4:
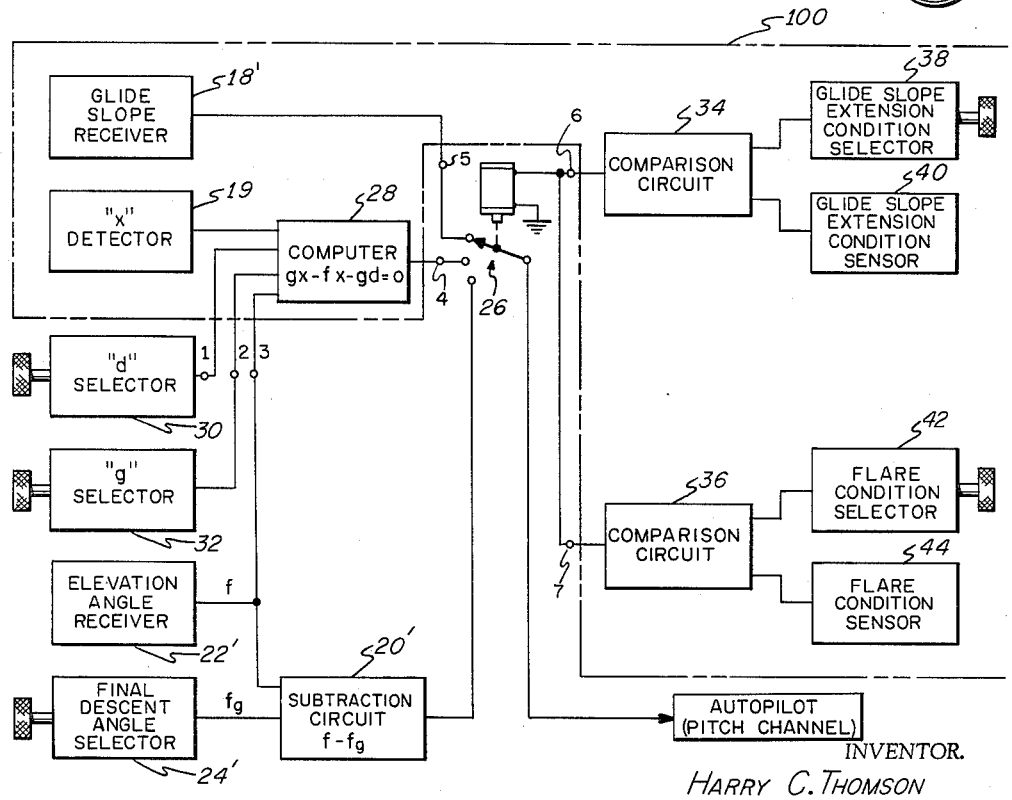
FIG. 4 is a block diagram of a form of the invention employing a presently preferred technique.

Referring to FIG. 4, a glide slope receiver 18' applies its output signal through a stepping switch 26 to the pitch channel of the craft autopilot when such switch is in the position shown. A computer 28, adapted to compute the algebraic expression to the left of FIG. 3 (which results from equating two expressions of altitude $h$), has applied thereto the following signals: $X$, $d$, $g$, and $f$. The signal $X$, representing craft range to the site $S_1$, is provided by a detector 19, e.g. radar or the apparatus shown in FIG. 6; the signal $d$ is provided by a selector 30 which may, for example, be a potentiometer adapted to be set by the pilot in proportion to the distance between the sites $S_1'$ and $S_2'$; the signal $g$ is provided by a selector 32 which also may be a potentiometer adapted to be set by the pilot in proportion to the angle of the glide slope at the airport at which a landing is being effected; the signal $f$ is provided by an elevation angle receiver 22' such as was mentioned previously. The output signal from the computer 28, if any, is applied to the second contact of the stepping switch 26. The third contact of the stepping switch 26 has the output signal from a comparison circuit 20' applied to it, such circuit being adapted to receive input signals from the elevation angle receiver 22' and a final descent angle selector 24'. The comparison circuit 20' may be like the comparison circuit 20 of FIG. 2.

The stepping switch 26 is stepped from position to position by output pulses from comparison circuits 34 and 36, each of which may be like the comparison circuit 10 of FIG. 2. The comparison circuit 34 provides an output pulse when the craft is at B (see FIG. 3) and receives input signals from a glide slope extension condition selector 38 and a glide slope extension condition sensor 40. The selector 38 may be a potentiometer adapted to provide an output signal representative of a particular value of one of the variables in the continually varying triangle $RXh$ and is adapted to be set by the pilot; the sensor 40 provides a signal representing the instantaneous value of the variable provided by the selector 38. The selector 38 and sensor 40 may, for example, produce output signals representing a particular transition altitude and the instantaneous altitude respectively.

A flare condition selector 42 provides an output signal representative of a particular value of one of the variables in the triangle $RXh$ when such triangle has a certain smaller configuration, such selector being, for example, a potentiometer adapted to be set by the pilot in a manner depending on the craft and the desired flare path. A flare condition sensor 44 provides an output signal representative of the instantaneous value of the variable provided by the selector 42. The selector 42 and sensor 44 may, like the selector 38 and sensor 40 respectively, produce altitude signals.

With reference now to FIGS. 3 and 4 together, the craft is flown along the glide slope by maintaining the pointers of a cross pointer meter at their respective neutral positions (reference should be had to the meter indications to the right of FIG. 3). As the craft descends down the glide slope from point A to point B, control of the craft is maintained solely by means of the glide slope receiver 18', i.e. the stepping switch 26 is in its first position. During this time, the computer 28 continually computes the aforementioned algebraic expression but, because the stepping switch 26 is in its first position, no use is made of the computation prior to the craft reaching B. When the craft is at B, the triangle $RXh$ configuration is such that the comparison circuit 34 produces an output pulse, thereby stepping the switch 26 to its second position, i.e. the selector 38 (which was set for a given point at which the pilot desired to decouple from glide slope receiver control) has an output signal of the same magnitude as the sensor 40 output signal.

After the switch 26 steps to its second position, control of the craft along the glide slope is maintained by the computer 28 output signal. During this phase of the landing maneuver, though the signals $g$ and $d$ are both constant, the signals $f$ and $X$ are continually changing, the signal $f$ continually following the signal X because the computer 28 causes the craft to continue on the glide slope to satisfy the aforementioned algebraic expression. Therefore, the pointers of the cross pointer meter, when the craft is at the points A, B and C, remain in their respective neutral positions as the craft holds the glide slope.

At the instant the craft reaches the point D, the instantaneous configuration of the triangle RX$h$ is the same as a selected configuration, thereby causing the comparison circuit 36 to produce an output pulse to step the switch 26 to its third position. With the switch 26 in its third position, the comparison circuit 20' output signal is applied to the pitch channel of the autopilot. Since, when the craft is at D, the elevation angle is greater than the angle selected by the final descent angle selector 24', the comparison circuit 20' produces a positive output signal; as a result, the "pitch" pointer of the indicator immediately deflects upward (as shown) and, as the autopilot causes the craft to nose upward in response to such positive signal, the craft executes a flare maneuver and the deflected pointer returns to its neutral position. That is, the craft flies a flare course on which the point E is located and in so doing causes the deflected pointer to return gradually to its neutral position, at which time the craft is flying at the final descent angle.

Figure 5:
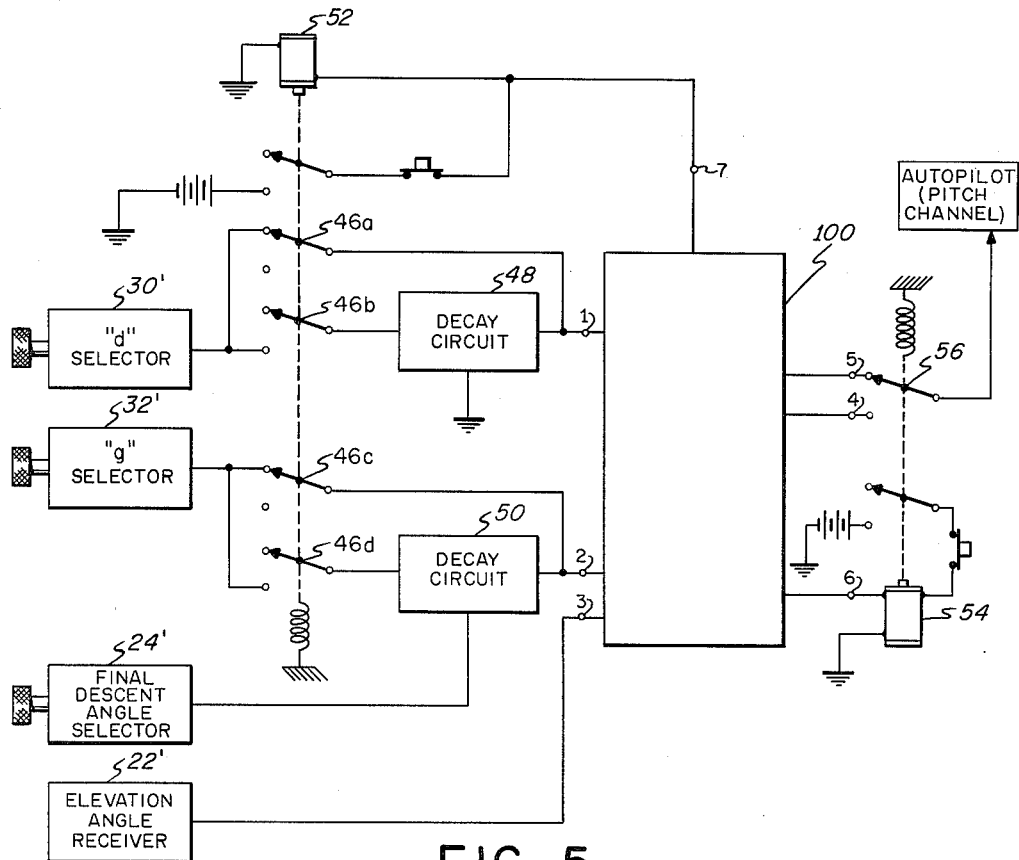
FIG. 5 is a block diagram of a circuit which, when used with part of the apparatus shown in FIG. 4, provides another embodiment of the presently preferred form.

FIG. 5 shows apparatus which provides the landing maneuver of FIG. 3 by so flying the craft that the meter pointers are continually held in their respective neutral positions. The circuit 100 of FIG. 5 is the circuit of FIG. 4 which is contained within the dashed lines, having corresponding leads 1 through 7.

A "$d$" selector 30' applies its output signal to the lead 1 through a switch 46$a$ when that switch is in its UP position; when the switch 46$a$ is in its DOWN position, the selector 30' output signal is applied instead through a switch 46$b$ to a decay circuit 48, the output of which is applied to the lead 1. A "$g$" selector 32' has its output signal applied through a switch 46$c$ to the lead 2 when the switch 46$c$ is in its UP position; when the switch 46$c$ is in its DOWN position, the selector 32' output signal is applied through a switch 46$d$ to a decay circuit 50, the output of which is applied to the lead 2. The decay circuits 48 and 50 have time constants so set that the craft will flare as shown in FIG. 3, the output signal provided by the circuit 48 gradually going from $d$ to zero and the output signal provided by the circuit 50 gradually going from $g$ to $f_g$, the $f_g$ signal bias being provided by a selector 24'. The output signal of an elevation angle receiver 22', is applied to the lead 3.

The signals produced on the leads 4, 5, 6 and 7 by the elements of the circuit 100 are used in the following manner: The signal on the lead 7 is applied to a normally unenergized relay 52; the signal on the lead 6 is applied to a normally unenergized relay 54; the signals on leads 4 and 5 are applied to the autopilot pitch channel when a switch 56 is in its DOWN and UP positions respectively. With this form of the invention the relays 52 and 54 together provide the functions of the stepping switch 26 of FIG. 4.

*In operation.*—As the craft descends down the glide slope from points A to B, the point at which a pulse appears on the lead 6 is gradually approached; prior to reaching point B, however, the switch 56 is in its UP position, thereby causing the glide slope receiver output signal to be applied to the pitch channel of the craft autopilot. At B, the relay 54 becomes energized, causing the signal appearing on the lead 4, i.e. the computer 28 output signal, to be applied instead to the autopilot pitch channel. As a result, the craft continues along the glide slope in the manner aforedescribed.

At D, the comparison circuit 36 has an output pulse which is applied to the lead 7 and causes the relay 52 to become energized, thereby moving the switches 46$a$ through 46$d$ to their respective DOWN positions. As a result, the "$gd$" and "$gX$" terms in the expression computed by the computer 28 respectively gradually vanish and gradually become equal to "$f_gX$." As this happens, the signal on the lead 4 changes to cause the craft to assume continually a new attitude until finally "$fX$" equals "$f_gX$," i.e. when the craft is on the final descent course. The time constants of the decay circuits 48 and 50 must be such that the decay provided by the circuit 48 is faster than the decay provided by the circuit 50; otherwise, a negative signal may be applied to the lead 4 in close proximity to the ground which will cause the craft to nose down, this being of course a dangerous occurence. In selecting the point D and the two decay circuit time constants, consideration must be given to the responsiveness of the craft to follow commanded pitch changes, this being so that the craft flare path will be tangent to the glide slope.

Figure 6:
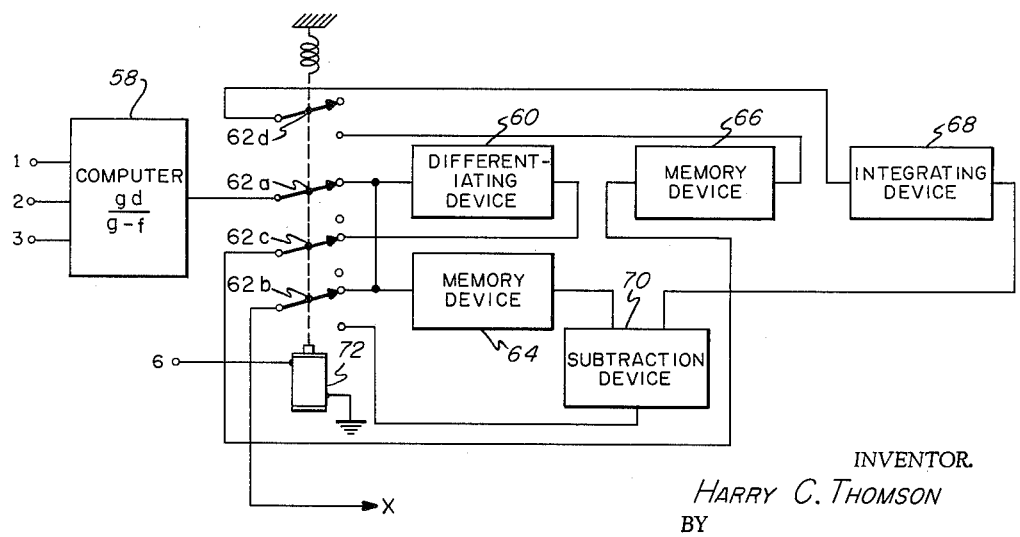
FIG. 6 is a block diagram of a range computer used by one form of the invention.

With reference now to FIG. 6, one form of "X" detector particularly useful with the present invention has a computer 58 adapted to receive the signals on the leads 1, 2 and 3 to provide a signal X by dividing $gd$ by ($g-f$). This signal is applied then to a differentiating device 60 and to a memory device 64 through a switch 62$a$; in addition, the signal X is applied through a switch 62$b$ to the output of the detector. The differentiating device 60 output signal is applied through a switch 62$c$ to a memory device 66, the output of which is applied to an integrating device 68 when a normally open switch 62$d$ is closed. The memory device 64 and the integrating device 68 have their respective output signals applied to a subtraction device 70 as minuend and subtrahend signals respectively. The difference output signal from the subtraction device 70 is applied through the switch 62$b$ to the output of the detector when that switch is DOWN. A self-holding relay 72 (self-holding contacts not shown), moves the switches 62$a$ through 62$d$ to their respective DOWN positions when a signal is on the lead 6.

Prior to actuation of the relay 72, the computer 58 provides the signal X and, while so doing, the memory device 64 continually stores such signal. During this time the differentiating device 60 produces a signal $\dot{X}$ which is memorized by the memory device 66. At the instant the relay 72 actuates, the measure of X stored by the memory device 64 becomes fixed and the differentiating device 60 ceases to have an output signal. However, at this instant the memory device 66 has its output signal applied to the integrating device 68 which, as time passes, produces an increasingly larger output signal, thereby causing the subtraction device 70 output signal to decrease continually. That is, at the instant relay 72 actuates, the subtraction device 70 produces an output signal representative of the range stored by the memory device 64 and, thereafter, such signal is decreased with time in the same manner that the distance X is decreased with time during the landing maneuver.

Referring to FIG. 7, the presently preferred form of the invention has an elevation angle receiver 22'', the output signal of which is applied to a subtraction circuit 74. A glide slope selector 76, e.g. a potentiometer across which a positive voltage is applied, is adapted to be set by the pilot to provide the glide slope signal $g$, such signal being applied through a switch 78 to the subtraction circuit 74. A final descent rate selector 79 (also a potentiometer) by which the pilot selects a final descent angle applies its output signal $f_g$ through a variable resistor 80 to the subtraction circuit 74 when the switch 78 is in its DOWN position. The signal applied through the switch 78 appears across a capacitor 82 which, together with the elements 78 and 80, form a glide slope memory and decay circuit 84. The subtraction circuit 74 output signal is applied across a potentiometer 86, the wiper of which is positioned in proportion to the range X in a manner to be described later. The potentiometer 86 therefore provides the product of the signal X multiplied by the subtraction circuit 74 output signal, such product signal being applied then to a subtraction circuit 88.

A "d" selector 30", e.g. a potentiometer adapted to be set by the pilot in proportion to the distance d, has the signal stored on the capacitor 82 applied across it; the signal on the selector 30" potentiometer wiper is applied through a switch 90 to the subtraction circuit 88 and across an RC circuit designated the "gd" decay circuit 92, such circuit 92 consisting of a capacitor 94 and a variable resistor 96. A resistor 98 is connected in series with the potentiometer 86 to assure that the voltage on the wiper of the potentiometer 86 is never zero.

The ouput signal from the subtraction circuit 88 is applied to a modulator 110 which converts that signal to an A.C. signal which operates to drive a servo 112 when a switch 114a is in its UP position. The servo 112 drives a generator 16 to provide the rate signal $\dot{X}$, such signal being applied to a subtraction circuit 118, the output signal of which is applied through a switch 114b to a limiter 120 when the switch 114b is in its UP position. The limiter 120 output signal in turn is applied to a servo 122 which drives the wiper of a potentiometer 124 so that the A.C. voltage on the wiper equals the signal X, the voltage on the potentiometer 124 wiper being applied to the subtraction circuit 118. A glide slope receiver 18" has its output signal applied through a switch 114c to the pitch channel of the craft autopilot when such switch is in its UP position; in its DOWN position, the switch 114c applies the output signal from the subtraction circuit 88 to the pitch channel of the craft autopilot.

A glide slope extend detector 126, e.g. the circuit consisting of FIG. 4 elements 34, 38 and 40, has its output signal applied to actuate a self-holding relay 128 (self-holding contacts not shown) when the point at which the glide slope extension is to be commenced is reached. When actuated, the relay 128 moves the switches 114a through 114c to their respective DOWN positions. A flare point detector 130, e.g. the circuit consisting of the FIG. 4 elements 36, 42 and 44, produces an output signal when the point at which the flare maneuver is to be commenced is reached. The detector 130 output signal is applied to actuate a self-holding relay 132 (self-holding contacts not shown) which moves the switches 78 and 90 to their respective DOWN positions.

The operation of the apparatus of FIG. 7 will be explained with reference to FIGS. 3 and 7: With the selectors 30, 76 and 79, and the detectors 126 and 130 all properly set, the craft proceeds down the glide slope from A to B under the control of the output signal from the glide slope receiver 18". During this time, the subtraction circuit 88 continually causes a signal to be applied to the servo 112 so that it drives to position its shaft to cause the potentiometer 86 wiper output signal to be such that the subtraction circuit 88 output signal is cancelled continually. At the same time, the potentiometer 124 wiper is made to store a signal representing the craft ground speed (prior to the craft reaching the point B). By keeping the response of the follow-up loop consisting of the elements 118, 120, 122 and 124 low, a signal representing average ground speed (and not instantaneous ground speed) is stored by the potentiometer 124 wiper, such averaging being desirable to prevent an erroneous computation by the circuit 88 should a wind gust occur at the switching point B. The limiter 120 serves to prevent excessive gust-produced ground speed changes from affecting the memorized average ground speed.

At the instant B is reached, the glide slope extend detector 126 produces an output signal which actuates the relay 128, thereby moving the switches 114a through 114c to their respective DOWN positions. When this occurs, the output signal from the subtraction circuit 118 is applied to the servo 112 to cause that servo to continue to drive at the same average rate that it had driven prior to the craft reaching point B; hence, the potentiometer 86 wiper continues to move at the same rate that it had heretofore. Since the subtraction circuit 88 sees no change in its input signals at the moment the relay 128 actuates, it produces no output signal at that time. Should the craft depart from the glide slope however, i.e. cause the elevation angle receiver 22" output signal f to change at a rate inconsistent with the rate at which the distance X is changing, the subtraction circuit 88 produces an output signal which causes the craft to reassume the glide slope, thereby cancelling the subtraction circuit 88 output signal.

At the instant the flare point D is reached, the detector 130 produces an output signal which causes the switches 78 and 90 to move to their respective DOWN positions. When this happens, the signal d stored on the capacitor 94 decays to zero as the capacitor 94 discharges through the variable resistor 96. Similarly, the signal g stored on the capacitor 82 discharges through the variable resistor 80 and through the selector 79 potentiometer. However, because the selector 79 potentiometer is biased (by $f_g$) the signal stored on the capacitor 82 discharges to equal the signal $f_g$. In the manner described with reference to FIG. 5, the subtraction circuit 88 eventually operates to equate $f_g X$ to $fX$ and thereby control the flight of the craft. By adjusting the resistors 96 and 80, the time constants of the two decay circuits may be varied to change the shape of the flare path desired; by use of the resistor 98, the signal at the output of the subtraction circuit 88 is prevented from being too negative near the ground.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for controlling the flight of an aircraft during a landing maneuver comprising first radio means for producing a signal proportional to the departure of said craft from a first straight line glide slope, second means for producing a signal proportional to the departure of said craft from a second straight line glide slope less steep than said first glide slope, and control means responsive to said first radio means output signal above a certain altitude and responsive to said second radio means output signal below that altitude, whereby the craft executes a landing maneuver by being flown to cancel continually the signal to which said control means responds.

2. Landing control apparatus for aircraft comprising means for controlling the flight of said craft, first means for producing a signal representing the craft displacement from a first radio defined straight line glide slope, and second means for producing a signal representing the craft displacement from a second radio defined straight line glide slope which is not as steep as said first glide slope but which intersects the earth at a greater ground range from the craft than the point at which said first glide slope intersects the earth, whereby the craft executes a landing maneuver by being flown to cancel the output signal from said first means above a certain altitude and flown to cancel the output signal from said second means below said altitude.

3. Landing control apparatus for aircraft comprising, first means for producing a signal representing the craft displacement from a first radio defined straight line glide slope, and second means for producing a signal representing the craft displacement from a second radio straight line defined glide slope which is not as steep as said first glide slope but which intersects the earth at a greater ground range from the craft than the point at which said first glide slope intersects the earth, and means responsive at an altitude above the point where both said glide slopes intersect to cause said craft to be flown to cancel said first means output signal when said craft is above said intersection point and cancel said second means output signal when said craft is below that point, thereby effecting a landing maneuver.

4. Apparatus for controlling the flight of an aircraft during a landing maneuver comprising first radio means producing a signal proportional to the departure of said craft from a first straight line glide slope, second means producing a signal proportional to the departure of said craft from a second straight line glide slope less steep than said first glide slope, and autopilot means responsive to said first radio means output signal above a certain altitude and responsive to said second radio means output signal below that altitude, whereby the craft executes a landing maneuver by being flown to cancel continually the signal to which said autopilot means responds.

5. Apparatus for controlling an aircraft during landing comprising first radio means producing a signal representing craft displacement from a first straight line glide slope, computer means producing a signal proportional to craft displacement from said first glide slope, second means producing a signal proportional to the craft displacement from a second straight line glide slope intersecting the earth at a ground range from said craft greater than the ground range of said craft to the point of intersection of the earth and said first glide slope, said second glide slope making a substantially smaller angle with the earth than the first glide slope, and means responsive to make said craft controllable by said first radio means output signal above a first altitude and controllable by said computer means output signal between said first altitude and a second lower altitude, said responsive means also making said craft controllable by said second radio means output signal below said second altitude, whereby said craft executes a landing maneuver by being flown to cancel continually its control signals.

6. Apparatus for controlling an aircraft during a landing maneuver comprising,
   (a) first radio means for producing a first control signal for controlling said craft along a first glide slope,
   (b) means for producing a signal representing the elevation angle of said craft from a point on the ground more distant from the craft than the point where said first glide slope intersects the ground,
   (c) means for producing a signal representing the craft ground range to said more distant point,
   (d) means for producing a signal representing the distance between said ground intersection points,
   (e) means for producing a signal representing the angle that said glide slope makes with the earth,
   (f) computer means for receiving all said signals and equating the product of said elevation angle and said ground range signals to the product of said glide slope signal multiplied by the difference between said ground range signal and the signal representing the distance between said points to produce a second control signal,
   (g) second means for producing a third control signal for controlling said craft along a final glide slope intersecting the earth at said more distant point, and
   (h) switching means for causing said craft to be controlled by said first radio means control signal above a certain altitude, by said computer means control signal between said certain altitude and a lower altitude, and by said second radio means control signal below the lower altitude.

7. The apparatus of claim 6 wherein said means for producing a signal representing the craft ground range to the more distant point comprises computing means adapted to receive the elevation angle signal, the signal representing the distance between the ground intersection points, and the glide slope angle signal to produce a quotient signal representing the product of the second and third named signals divided by the difference between the third and first named signals, means for producing a signal representing the rate that said quotient signal changes, means for integrating said quotient rate signal, subtraction means for producing the difference between the quotient and integrated quotient rate signals, and means responsive above a certain altitude to provide said quotient signal as said ground range signal and below that certain altitude to integrate the quotient rate signal which occurred at that altitude and provide as said ground range signal the difference between the integrated rate signal and the quotient signal which occurred at that altitude.

8. Apparatus for controlling an aircraft during a landing maneuver comprising,
   (a) radio means for producing a first control signal for controlling said craft along a first glide slope,
   (b) means for producing a signal representing the elevation angle of said craft from a point on the ground more distant from the craft than the point where said first glide slope intersects the ground,
   (c) means for producing a signal representing the craft ground range to said more distant point,
   (d) means for producing a signal representing the distance between said points,
   (e) means for producing a signal representing the angle that said glide slope makes with the earth,
   (f) computer means for receiving all said signals and equating the product of said elevation angle and said ground range signals to the product of said glide slope signal multiplied by the difference between said ground range signal and the signal representing the distance between said points to produce a second control signal,
   (g) means for producing a signal representing the angle that a final descent course, intersecting the earth at said more distant point, makes with the earth,
   (h) means for producing a control signal representing the difference between the elevation angle and said final descent course angle signals, and
   (i) switching means for causing said craft to be controllable by said radio means control signal above a certain altitude, by said computer means control signal between said certain altitude and a lower altitude, and by the control signal from said means producing a signal representing the difference between said angle signals below said lower altitude, whereby the craft goes through landing maneuvers by being flown to keep the applicable control signal zero.

9. Landing control apparatus for aircraft comprising,
   (a) means producing a signal representing the angle that a first glide slope makes with the ground,
   (b) means producing a signal representing the angle that a second glide slope less steep than said first glide slope makes with the ground, said second glide slope intersecting the ground at a greater ground range from the craft than said first glide slope,
   (c) means producing a signal representing the difference distance between the points when said glide slopes respectively intersect the ground,
   (d) means producing a signal representing the craft ground range to the point where said second glide slope intersects the ground,
   (e) means producing a signal representing the elevation angle of the craft from the point where said second glide slope interesects the ground,
   (f) means receiving the ground range signal, the elevation angle signal, the first glide slope angle signal, and the difference distance signal equating the product of the ground range signal multiplied by the elevation angle signal to the product of the first glide slope angle signal multiplied by the difference between the ground range signal and the difference distance signal to produce a first control signal, (g) means comparing the elevation angle signal with the second glide slope angle signal to produce a second control signal, (h) and means responsive above a certain altitude to said first control signal and responsive below that altitude to said second control signal, whereby the craft is flown through a landing maneuver by continually cancelling the applicable control signal.

10. Landing control apparatus for aircraft comprising, (a) means producing a signal representing the angle that a first glide slope makes with the ground, (b) means producing a signal representing the difference between points where said first glide slope and a second glide slope respectively intersect the ground, said second glide slope being less steep than said first glide slope and intersecting the ground at a greater ground range from the craft than the point where said first glide slope intersects the ground, (c) means producing a signal representing the craft ground range to the point where said second glide slope intersects the ground, (d) means producing a signal representing the elevation angle of the craft from the point where said second glide slope intersects the ground, (e) means receiving the ground range signal, the elevation angle signal, the first glide slope angle signal, and the difference distance signal to equate the product of the ground range signal multiplied by the elevation angle signal to the product of the first glide slope angle signal multiplied by the difference between the ground range signal and the difference distance signal to produce a control signal, and (f) means responsive at a certain altitude to cause said difference distance signal to be cancelled and said first glide slope angle signal to become representative of the angle that said second glide slope makes with the ground, whereby the craft effects a landing maneuver by being flown continually to cancel the control signal.

11. The apparatus of claim 9 wherein said means responsive at a certain altitude causes said difference distance signal to be cancelled gradually and said glide angle signal to become gradually representative of the angle that said glide slope makes with the ground.

12. The apparatus of claim 10 wherein said means for producing a signal representing the craft ground range to the more distant point comprises computing means adapted to receive the elevation angle signal, the signal representing the distance between the ground intersection points, and the glide slope angle signal to produce a signal representing the quotient of the second and third named signals divided by the difference between the third and first named signals, means for producing a signal representing the average rate that said quotient signal changes, means for integrating said quotient rate signal, subtraction means for producing the difference between the quotient and integrated quotient rate signals, and means responsive above a certain altitude to provide said quotient signal as said ground range signal and below that certain altitude to integrate the quotient rate signal which occurred at that altitude and provide the difference beween the integrated rate signal and the quotient signal which occurred at that altitude as said ground range signal, such signal being provided by said subtraction means.

References Cited by the Examiner

UNITED STATES PATENTS 3,052,427    9/62    Match et al. _____ 343—108

FOREIGN PATENTS 1,260,282    3/61    France.

CHESTER L. JUSTUS, *Primary Examiner.*